(No Model.)
O. B. THOMPSON.
DEVICE FOR OVERCOMING DEAD CENTERS AND STARTING FLY WHEELS.
No. 327,355. Patented Sept. 29, 1885.
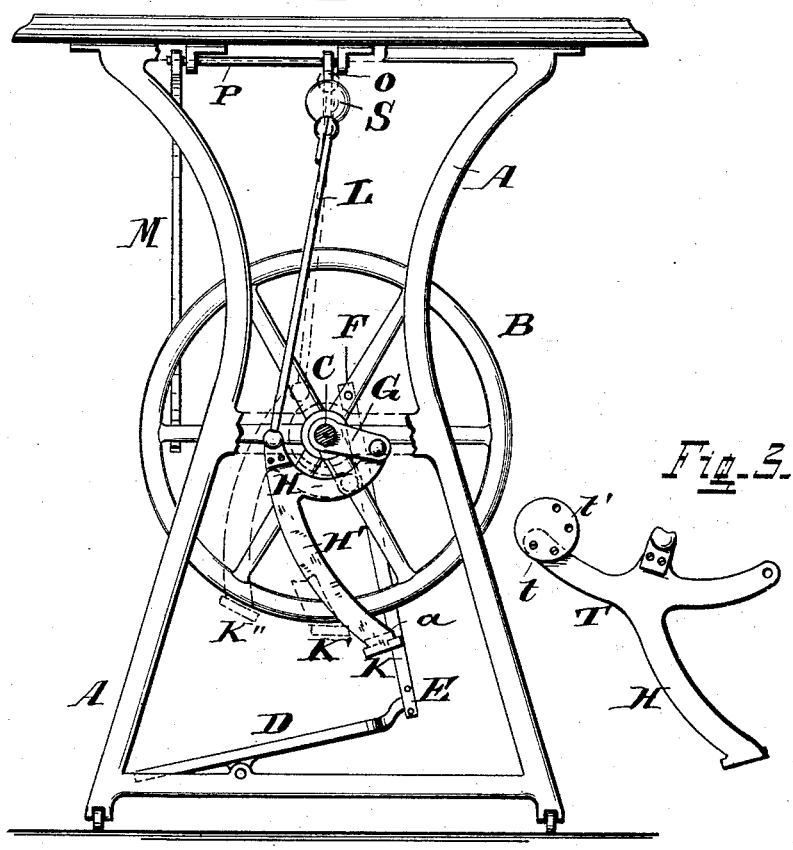
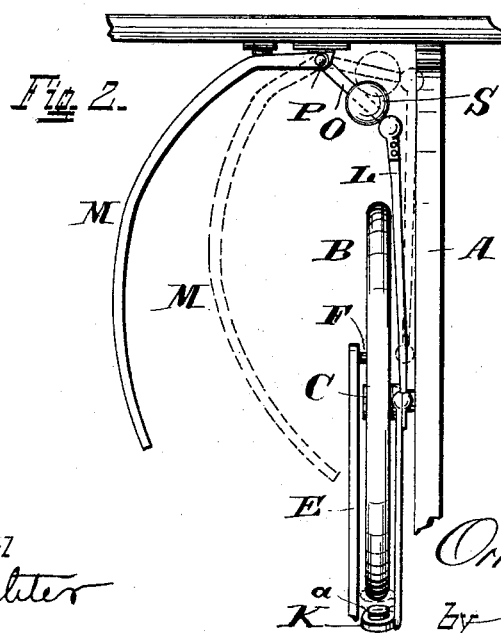
Attest
Carl Spengel
Otto Richter
Inventor
Orrin B. Thompson
by Mear Pick Att'ys

UNITED STATES PATENT OFFICE.

ORRIN B. THOMPSON, OF JERSEY, OHIO.

DEVICE FOR OVERCOMING DEAD-CENTERS AND STARTING FLY-WHEELS.

SPECIFICATION forming part of Letters Patent No. 327,355, dated September 29, 1885.

Application filed January 29, 1885. (No model.)

*To all whom it may concern:*

Be it known that I, ORRIN B. THOMPSON, a citizen of the United States, residing at Jersey, in the county of Licking and State of Ohio, have invented certain new and useful Improvements in Devices for Overcoming Dead-Centers and Starting Fly-Wheels, of which the following is a full, clear, and exact description, reference being had to the accompanying drawings, forming a part of this specification.

My invention relates to an improved device for overcoming dead-centers and starting and governing the motion of fly-wheels, and is more especially adapted to use on sewing-machines where a fly-wheel operated by a pedal gives motion to a shaft; and it consists in an eccentric bell-crank wiper pivoted at one end to an arm loosely journaled concentric with the shaft of the fly-wheel, and having attached to its elbow an operating-rod with suitable mechanism whereby when said bell-crank is drawn in one direction, a toe or stirrup on the bell-crank engages with the periphery or rim of the fly-wheel in such manner as to produce a partial revolution of the fly-wheel; also in connecting the operating-rod of the bell-crank wiper with lever mechanism arranged to be operated by the knee of the person operating the machine. The object of this mechanism is to start the wheel in the proper direction or throw it past a dead-center, and if it be revolving in the wrong direction to reverse it; also, when in operation, to act as a brake to prevent the wheel revolving in the wrong direction.

In the accompanying drawings, Figure 1 is a side elevation showing the device attached to an ordinary fly-wheel operated by a pedal. Fig. 2 is a front elevation of the same. Fig. 3 shows a modified form of counter-balance.

The same letters of reference are used to indicate identical parts in all the figures.

A is a frame supporting the fly-wheel, shaft, &c. B is a fly-wheel supported on said frame, and keyed or fastened to the shaft C.

D is a pedal, to which is pivoted the pitman E, pivoted to the fly-wheel at F.

G is an arm loosely pivoted concentric with the axis of the fly-wheel B. To the other end of this arm is pivoted one arm of the bell-crank H. The other arm, H', of the bell-crank extends to or beyond the rim of the fly-wheel, and is provided with a stirrup, K, extending across the periphery of the fly-wheel and provided with an elastic pad, *a*. This pad is usually made of rubber, and being elastic and soft it readily catches on the surface of the wheel to hold it or revolve it in the direction of its own motion.

To the elbow of the bell-crank H is pivoted an operating-rod, L. To the upper end of this rod is pivoted a short connecting-rod, O, and the other end is firmly attached to a rotating shaft, P. To this shaft P is also firmly attached a lever, M, so shaped and arranged as to be within easy reach of the knee of the operator of the machine.

S is a counterbalance-weight attached to the arm O to make the crank drop back to its normal position. The bell-crank wiper is so arranged that it moves eccentric to the fly-wheel, and when it is swung by means of the operating-rod L into the position indicated at K' by the dotted lines, the stirrup K impinges upon the periphery of the fly-wheel and prevents its revolving in one direction but permits it to revolve in the direction indicated by the arrow, because revolving in the direction of the arrow the motion of the wheel would be away from the stirrup. If the arm L draws or swings the crank farther, as into the position shown by the dotted lines K'', that motion of the arm H' and stirrup K moves the fly-wheel just that far in the direction indicated by the arrow and starts the wheel, its motion being continued by the pedal. If the wheel stood at a dead-center, the motion of the bell-crank wiper will have carried it beyond the dead-center. If the first movement of the crank should bring the fly-wheel to the dead-center point, a second operation of the lever M and bell-crank carries it beyond the dead-center point and its motion is continued by the pedal. Should the wheel be revolving in the wrong direction— that is, opposite to that indicated by the arrow—by drawing the rod L upward and bringing the cushioned stirrup K against the wheel it acts as a brake on the wheel, stops its motion, and then starts it in the right direction, thus reversing the wheel, and the pressure on the pedal keeps it going in the right or reversed direction.

The lever M, which operates the bell-crank wiper, is arranged, by means of the rod L, with universal joints when necessary, and the shaft P, to be within easy reach of the knee of the person operating the pedals. A lateral motion of the knee moves the lever M to the position indicated by dotted lines in Fig. 2. That motion draws the rod L upward and swings the crank and stirrup into the position shown by dotted lines in Fig. 1, and starts the wheel B, preventing any lock by reason of its being at a dead-center point.

If the weight of the bell-crank wiper is not sufficient to cause it to drop back to its normal position when not in operation, a counterbalance-weight is applied to the shaft P by the rod O, as shown at S, or in any convenient manner, thus avoiding the use of springs in any way.

Instead of applying my device to the fly-wheel operated by the pedal, a special balance-wheel may be put on the shaft, to which the crank may be applied.

The stirrup or toe may be arranged so as to push against the inside of the rim of the wheel instead of pulling on the periphery, in which case the motion of the crank and the entire operation is just reversed.

Fig. 3 shows a modified form of counterbalance, in which a third arm, T, is added to the bell-crank wiper, on the end of which is an adjustable weight, O, which turns on a screw, t, and may be fastened in various positions by the screw t, and can be adjusted to vary its force. It may be adjusted so as to cause the pad to touch the fly-wheel lightly or to come almost in contact with it. In that position the pad does retard the motion of the wheel when revolving in one direction, but acts as a constant brake against its revolving in the other.

Of course, by a slight change in the relations and positions of the parts and the connecting mechanism, the bell-crank wiper may be arranged to operate in the opposite direction or upon a wheel whose axis is at right angles to the one shown in the drawings.

Having thus fully described my invention, I claim—

1. A device for overcoming dead-centers and starting a fly-wheel, consisting of a bell-crank wiper, one arm of which is attached to an arm loosely pivoted at the axis of the fly-wheel so as to rotate in the same direction as the fly-wheel, but eccentric to it, and having on its other arm a stirrup or toe adapted to press against the periphery of the wheel, substantially as described.

2. The bell-crank wiper H, arranged to move in the same direction with and eccentric to the wheel B, and having the stirrup K, in combination with the lever M, connected to the operating-rod of the crank and located within reach of the knee of the operator of the pedal, substantially as and for the purpose described.

3. In combination with a bell-crank wiper for starting a pedal-driven wheel, the lever M, connected with said device for putting it in operation, and arranged, as described, so as to be within reach of the knee of the operator, substantially as and for the purpose specified.

4. In combination with the bell-crank wiper, the padded stirrup K, for moving the fly-wheel, substantially as described.

5. A bell-crank wiper pivoted eccentric to the fly-wheel B and carrying the stirrup K, in combination with the jointed arm L, rotating shaft P, and lever M, as and for the purpose specified.

6. The bell-crank wiper H, pivoted to the crank G and eccentric to the wheel B, in combination with the operating-arm L, and the balance-weight S, substantially as and for the purpose described.

7. In a device for overcoming dead-centers and starting fly-wheels, an elastic pad arranged in combination with an arm or stirrup to act upon the periphery of the fly-wheel in such a manner as to act as a brake on the wheel revolving in one direction, and susceptible of imparting motion to the wheel in the other direction, substantially as described.

8. In a device for starting fly-wheel, the adjustable counter-balance O, in combination with the bell-crank wiper H, as and for the purpose specified.

ORRIN B. THOMPSON.

Witnesses:
E. W. RECTOR,
OTTO RICHTER.